C. J. COBERLY.
MOTION PICTURE CAMERA.
APPLICATION FILED APR. 24, 1916.

1,243,262.

Patented Oct. 16, 1917.

Inventor
Clarence J. Coberly
by Townsend Graham + Hair
his Attorneys

UNITED STATES PATENT OFFICE.

CLARENCE J. COBERLY, OF GLENDALE, CALIFORNIA.

MOTION-PICTURE CAMERA.

1,243,262.  Specification of Letters Patent.  Patented Oct. 16, 1917.

Application filed April 24, 1916. Serial No. 93,329.

*To all whom it may concern:*

Be it known that I, CLARENCE J. COBERLY, a citizen of the United States, residing at Glendale, in the county of Los Angeles and State of California, have invented a new and useful Motion-Picture Camera, of which the following is a specification.

My invention relates to the art of producing motion pictures. The principal object of the invention is to produce an improved motion picture camera.

In the forms of camera now in common use, much trouble and expense is occasioned by disruptive discharges of static electricity, these discharges taking place from the film to various portions of the camera, thus fogging the film, and often spoiling large quantities thereof. An injury to a motion picture film may cause expenses far beyond the mere cost of the film, as it may necessitate retaking scenes which have cost a great deal of money to produce. Trouble with static electricity is very common and occasions great losses to the producers of motion picture films. By my invention I prevent disruptive discharges from the film, so that these losses are entirely done away with.

The production of static electricity is not peculiar to the motion picture art, but trouble has been experienced with it in various other arts. Static electricity is ordinarily produced on a moving body which is a fair insulator partly by friction and partly by induction. Various methods of removing the static electricity from a moving body have been produced. So far as I am aware all of these methods involve either brush discharges, or disruptive discharges from the moving body. As the emulsion of the film is easily fogged by either disruptive or brush discharges, such methods are not applicable to motion picture cameras.

In my invention I provide means for neutralizing the static at any point at which it is likely to appear in either the manufacture or the use of the film by supplying a charge of opposite polarity, and for this purpose the apparatus illustrated in the drawings may be used.

In the drawings, which are for illustrative purposes only:

Figure 1:
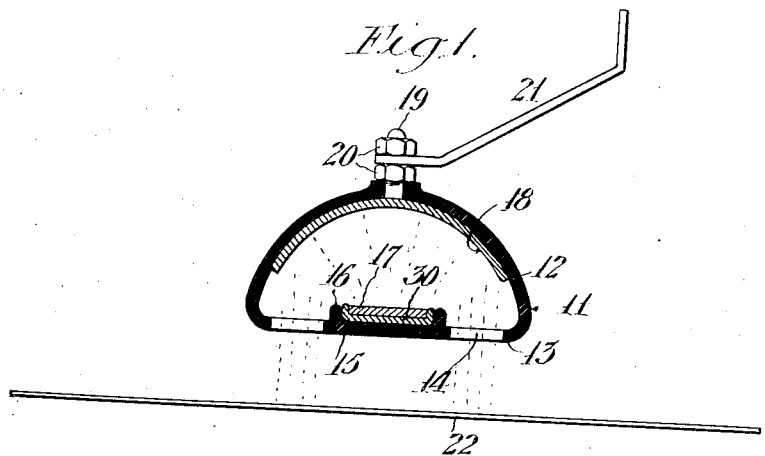
Figure 1 is a sectional view on an enlarged scale through the center of a neutralizing chamber in position adjacent to a film.
Figure 2:
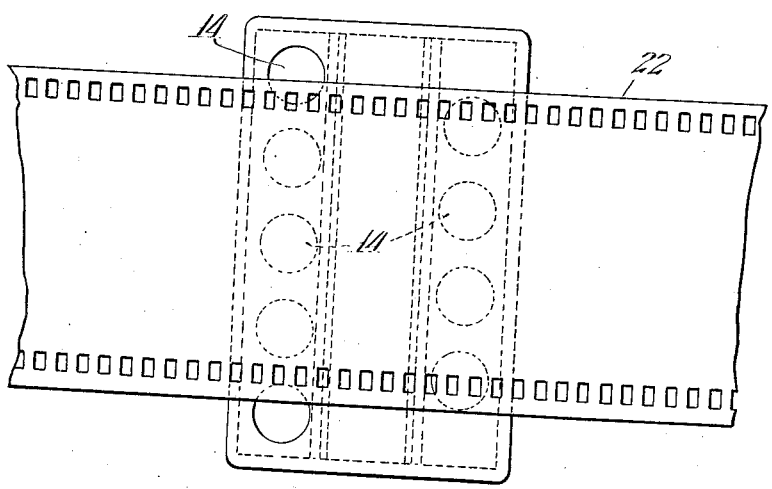
Fig. 2 is a front view of a neutralizing chamber.

In the form of the invention illustrated in these drawings, 11 is a chamber formed of insulating material, preferably molded in the form shown. This chamber is semi-cylindrical in shape, having an imperforate back 12 and a front 13 which is provided with a plurality of openings 14, these openings being on either side of a central bar 15 which extends completely across the chamber and is provided with ribs 16 on either side thereof. The bar 15 and the ribs 16 form a screen, the purpose of which will be later explained. Located between the ribs 16 is a uranium plate 17, this plate being cemented in place, or secured by any other convenient means. In the extreme back of the chamber is a grounded metallic plate 18, this plate being secured by a screw 19 having nuts 20 thereon, these nuts being used to clamp the complete device in place on a support 21. The front 13 of the chamber is placed a short distance away from the film 22, the neutralizing chamber being used wherever it is desired to neutralize static, either during its course of manufacture or use.

In some cases I place a metal plate 30 between the bar 15 and the uranium plate 17 to still further screen off direct radiation from the film.

The method of operation of the invention is as follows:

The parts being located as shown in Fig. 1, and the film moving in either direction in a line parallel to the front 13 of the chamber 12, there is a continuous neutralizing action due to the radio activity of the uranium. The radio active rays given off by the uranium from the side toward the film, are completely shut off or screened by the bar 15, so that there is no radiation from the uranium toward the film, this shielding of the film from the rays being further accomplished by the use of the ribs 16. There is, however, a steady flow of rays from the opposite side of the uranium plate 17, these rays acting on the air to thoroughly ionize same, the ionized air having both positive and negative charges. These charges are affected by induction by the charge on the film 22, the ions of the proper polarity passing through the openings 14 and striking against the film 22 completely neutralizing the charges thereon. The charges of opposite polarity are collected by the ground plate 18 and are carried to the grounded support 21 through the screw 19.

I have shown and described a uranium plate as the ionizing body, and there are several reasons why I prefer to use uranium. In the first place it is free from the emanations which are given off by many radio active bodies. Such emanations are objectionable as they produce undesirable changes in the film itself. In the second place, uranium gives off a large proportion of alpha rays which are particularly effective in ionizing air. It may be explained that different radio active substances give off alpha, beta, and gamma rays in different proportions, and I have found that it is desirable to select a material such as uranium which gives off a large proportion of alpha radiation. In the third place it is necessary to use a substance which is reasonable in cost. For all these reasons I prefer to use uranium.

While uranium has properties as outlined above, which make it especially applicable to this particular purpose, there are other materials which may be used, subject to certain disadvantages. Among these may be mentioned thorium, radium, actinium, polonium and other radioactive bodies, their derivatives, chemical compounds, and minerals.

In the same manner, while I have described the ionization of air by a radioactive body, there are other means by which such ionization may be produced. For example, such ionization may occur due to the action of the cathode, Rontgen, ultra violet, canal, Lenard, or similar rays; due to the action of high temperatures produced by incandescence or combustion; due to the action of moist air on phosphorus, potassium sodium or other minerals; or due to the action of brush or disruptive discharges of electricity. For various practical reasons I prefer to use uranium mounted and employed as shown above, but I do not wish to be understood as confining my invention strictly to the structure or materials described, my invention being limited and defined by the following claims.

I claim as my invention:—

1. The method of neutralizing electrical charges carried on a motion picture film which consists in moving the film in proximity to a grounded conductor; and placing a body of radioactive material in such a position as to supply ionized material to the space between said grounded conductor and said motion picture film, said motion picture film being shielded from direct radiation from said body of radioactive material.

2. The method of neutralizing electrical charges carried on a motion picture film which consists in moving the film in proximity to a grounded conductor; and placing a piece of uranium in such a position as to supply ionized material to the space between said grounded conductor and said motion picture film, said motion picture film being shielded from the direct radiation from said piece of uranium.

3. A neutralizer for motion picture films comprising a hollow semicylindrical body of insulating material having openings in a wall passing across its diameter; a grounded metallic plate inside said body; and means for ionizing the space inside said body.

4. A neutralizer for motion picture films comprising a hollow semicylindrical body of insulating material having openings in a wall passing across its diameter; a grounded metallic plate inside said body; and a plate of radioactive material inside said body.

5. A neutralizer for motion picture films comprising a hollow semicylindrical body of insulating material having openings in a wall passing across its diameter; a grounded metallic plate inside said body; and a body of uranium inside said hollow body.

6. A neutralizer for motion picture films comprising a hollow semicylindrical body of insulating material having openings in a wall passing across its diameter; a grounded metallic plate inside said body; and a body of uranium located on the inner side of said wall in such a position that there is no direct radiation through said openings.

In testimony whereof, I have hereunto set my hand at Los Angeles, California, this 13th day of April, 1916.

CLARENCE J. COBERLY.